Dec. 19, 1967    F. WITTEMAN ET AL    3,359,114
BUOYANT FISHING LURE
Filed June 1, 1964

FRANK WITTEMAN
RICHARD T. WITTEMAN
INVENTORS.

BY *Lyon & Lyon*
ATTORNEYS

United States Patent Office 3,359,114
Patented Dec. 19, 1967

3,359,114
BUOYANT FISHING LURE
Frank Witteman and Richard T. Witteman, both of 4614
Grand Ave., La Canada, Calif. 91011
Filed June 1, 1964, Ser. No. 371,247
10 Claims. (Cl. 99—3)

ABSTRACT OF THE DISCLOSURE

A fishing lure composition for attaching to a fishing hook where a quantity of minute buoyant microspheres of a material which is unaffected by a bait material are dispersed in a normally non-buoyant fishing bait material to produce a sufficient buoyancy to cause the fish hook to float.

---

This invention relates to fishing lures and, in particular, is directed to a buoyant lure comprising a mixture of any of the known and desired fishing bait materials which are generally non-buoyant and minute buoyant particles for producing buoyancy without otherwise affecting the properties of the bait material.

There are many well known organic fishing bait materials that have varied desirable characteristics for luring fish, but most of such bait materials have a specific gravity greater than 1.0 and, therefore, are nonbuoyant. Moreover, when such bait materials are applied to a hook for use, the resultant combination of hook and bait is substantially non-buoyant even though the bait material alone may have been nearly buoyant. Thus, in use, the bait and hook will sink to the bottom of the lake or river where the bait is generally less effective in luring fish. One traditional solution to this problem has been to employ a float or bob on the fishing line at an appropriate distance above the baited hook for suspending the baited hook above the bottom of the body of water. However, a float or bob is unusable in stream fishing particularly in fast moving streams or rather shallow streams. Further, the use of a float or bob presupposes a knowledge of the actual depth of the lake or the like at that specific location, but the bob and line may drift to substantially different locations of different depths.

Accordingly, it is a principal object of this invention to provide a novel fishing lure wherein a non-buoyant fishing bait is made buoyant by combining and dispersing therein a selected quantity of highly buoyant particles. A further object of this invention is to provide such a fishing lure wherein the buoyant particles are of an inorganic material whereby the various desirable properties such as consistency, odor, color, general appearance, etc. of the fishing bait are unaltered. Still another object of this invention is to provide an organic fishing lure material having a sufficient buoyancy to support an appropriate hook wherein such buoyancy is achieved by dispersing an adequate quantity of hollow microspheres formed of an inorganic material within the organic bait material.

Other and more detailed objects and advantages of this invention will appear from the following description and the accompanying drawings, wherein.

The buoyant fishing lure, generally designated 10, of this invention is comprised of any desired fishing bait material 11 mixed with a quantity of minute buoyant particles in the form of microspheres 12. The fishing bait material 11 may be of any of the multitude of common baits used by fisherman such as cheese, salmon eggs, meat, fish, and other organic substances or any combination of such baits. These common fishing baits are relatively non-buoyant as, for example, American cheese, which has a specific gravity of 1.2.

Figure 1:
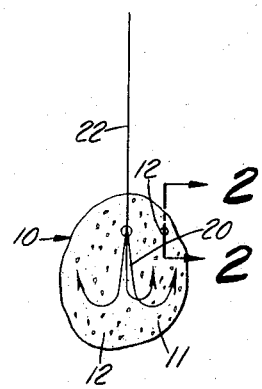
FIGURE 1 is a perspective view of the fishing lure of this invention applied to a conventional fishing hook.
Figure 2:
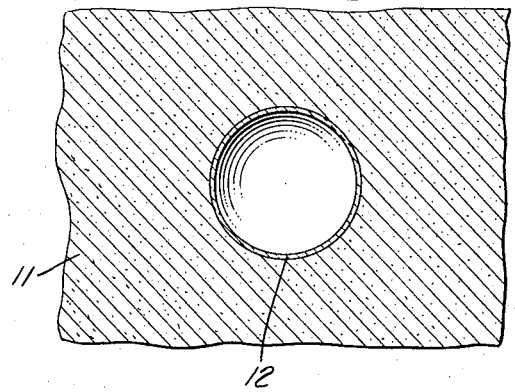
FIGURE 2 is a fragmentary and highly magnified sectional view of the fishing lure material of this invention taken for example on line 2—2 of FIGURE 1.

The buoyant minute particles or microspheres 12 may be of varying size and individual specific gravity, but it is specifically contemplated by this invention that extremely small and highly buoyant microspheres be employed. Further, the microspheres 12 must be of a material which is unaffected by the fishing bait material 11 and which in turn does not effect the fishing bait material. Various materials which are unaffected by the fishing bait material 11 will be completely satisfactory for comprising microspheres 12 such as glass, plastic, ceramic, etc. For example, hollow glass microspheres having diameters between 30 and 300 microns, and having a true specific gravity of approximately 0.30 have been found to be extremely satisfactory. Due to the minuteness of these microspheres, a bulk quantity of them has the appearance of a powder and they lose their separate identity when mixed with the fishing bait material 11. It is to be noted that the visual appearance of such microspheres has been exaggerated in FIGURE 1 for illustrative purposes. These glass microspheres are available under the trademark "Eccospheres" and similar microspheres are commercially available in other materials such as the plastic ones available under the trademark "Microballoons."

The non-buoyant fishing bait material 11 and the buoyant microspheres 12 are mixed together in appropriate percentages by weight or volume in relation to their respective specific gravities to produce a resultant mass having a specific gravity less than 1 and preferably in the range of 0.8 to 0.9. Further, it is specifically contemplated by this invention that the microspheres be relatively uniformly dispersed throughout the fishing bait material 11 and, therefore, a mixing procedure will be necessary to accomplish such dispersion. Certain desirable fishing bait materials 11 will require heating or dilution in order to permit such mixing procedure. Further, it is also preferred that with certain of the fishing bait materials, appropriate agents be added for adjusting the consistency or viscosity of the mixture or for preserving the organic fishing bait material. Specific examples of successful lures of this invention that have been compounded are presented as follows, but such examples are merely illustrative and in no way intended to be all inclusive or representative of the possible scope of lures that may be compounded:

(1) Mixing 94% by weight of Velveta cheese with 6% by weight of either Microballoons or Eccospheres in pony or dough mixer without heating.

(2) Mixing 94% by weight of an American cheese or other types of cheese with 6% by weight of Microballoons or Eccospheres in a pony or dough mixer and adding small quantities of water or a water solution of methyl cellulose or other viscosity adjusting agents to adjust the consistency of the mixture to the proper stiffness for use.

(3) Mixing 94% by weight of hamburger with 6% by weight of Microballoons or Eccospheres and adding salicylic acid thereto as a preservative.

(4) Mixing 95% by weight of mashed salmon eggs with 5% by weight of Microballoons or Eccospheres in an appropriate pony or dough mixer.

The resultant fishing lure material 10 will be substantially buoyant in that the specific gravity will be in the general range of 0.8 to 0.9. For example, the various cheeses have a specific gravity of approximately 1.2 and since the Eccospheres have a true specific gravity of approximately 0.30, the resultant material when mixed in the above weight percentages will have a specific gravity of approximately 0.8 to 0.9. This buoyant fishing lure material 10 may then be applied to a fishing hook 20 in the conventional manner desired by the individual fisherman and the resultant combination of hook and lure material will still be buoyant.

Figure 3:
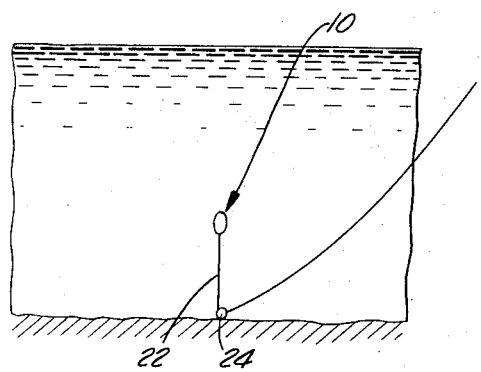
FIGURES 3, 4 and 5 are elevation views of various manners in which the fishing lure of this invention may be employed.
Figure 4:
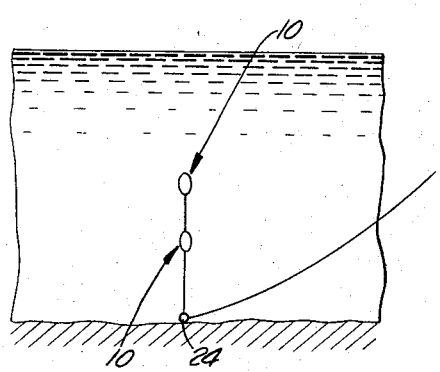
Figure 5:
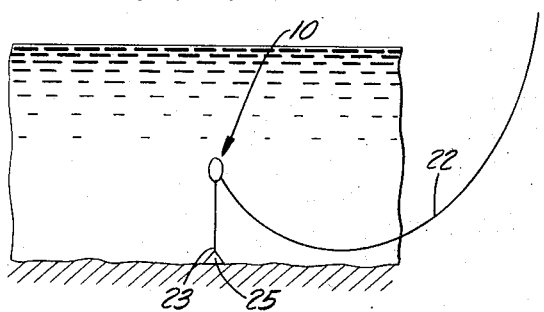

This buoyant fishing material may be used in any desired manner as, for example, by attaching the fishing hook 20 to a line or leader 22. A split shot weight 24 or the like is attached to the leader 22 at a short distance from the hook as shown in FIGURE 3 and, therefore, the buoyant fishing lure is suspended in the water that distance above the bottom. Additional hooks 20 and lures 10 may be attached to leader 22 at appropriate spaced locations for reaching differing depths simultaneously as shown in FIGURE 4. One alternative to these arrangements is shown in FIGURE 5 wherein the hook supporting the buoyant lure 10 is attached to the leader 22 at a short distance from the end 23 and a sinker 25 or the like is attached at end 23. By using any of these arrangements of FIGURES 3, 4 and 5 or other arrangements that will readily occur to the fisherman, the distance that the lure 10 will be spaced from the bottom of the lake or stream may be adjusted to achieve the best possible fish luring effect. For example, it has been found in fishing for trout in streams or lakes the best results are achieved if the sinker and hook relationship is such that the baited hook is suspended approximately 1 to 2 inches from the bottom. However the actual mounting distance can be adjusted to compensate for the terrain of the bottom, such as rock, weeds or grass, whereby the lure 10 will be at the desired distance from the bottom. Moreover, since the hook and bait are suspended from the bottom and only the sinker rests thereon, the snagging of the hook on rocks or debris on the bottom is minimized and such snagging of the sinker is both less apt to occur and further minimized by being slightly buoyed upwardly by the effect of the buoyant fishing lure 10.

Having fully described our invention it is to be understood that we do not wish to be limited to the details herein set forth or to the details illustrated in the drawings, but our invention is of the full scope of the appended claims.

We claim:

1. A fishing lure composition for mounting on and engulfing a fish hook comprising, a fishing bait material having a substantially non-buoyant density and a multiplicity of buoyant density microspheres of a substance which is unaffected by said bait material and dispersed in said material in a quantity for causing a buoyant density.

2. A fishing lure comprising, a fish hook for attaching to a line, a non-buoyant fishing bait material having a semi-solid consistency for molding onto said fish hook, and a multiplicity of buoyant microspheres of a substance which is unaffected by said bait material and dispersed within said material for producing a buoyant mass to cause the fish hook to float.

3. A fishing lure composition for mounting on and engulfing a fish hook comprising, an organic fishing bait material having a substantially non-buoyant density, microspheres having a highly buoyant density, said microspheres being of a substance unaffected by said bait material, and a multiplicity of said microspheres dispersed in said bait material in a ratio of weights and densities of said microspheres and said bait material for producing a resultant buoyant density.

4. A fishing lure composition for mounting on and engulfing a fish hook comprising an organic fishing bait material having a substantially non-buoyant density, a preservative agent mixed with said bait material, microspheres having a highly buoyant density, said microspheres being of a substance unaffected by said bait material, and a multiplicity of said microspheres dispersed in said bait material in a ratio of weights and densities of said microspheres and said bait material for producing a resultant buoyant density.

5. A fishing lure composition for mounting on and engulfing a fish hook comprising a non-buoyant bait material, a multiplicity of buoyant microspheres of a substance which is unaffected by said bait material and dispersed within said bait material, means mixed with said dispersion of bait material and microspheres for adjusting the viscosity thereof to a semi-solid consistency for molding onto the fish hook, and the relationship of densities and quantities of said bait material, said microspheres and said viscosity adjusting means controlled for producing a buoyant mass.

6. A fishing lure composition for mounting on and engulfing a fish hook comprising, a non-buoyant bait material, hollow microspheres of a substance unaffected by the bait material and having a true specific gravity of approximately 0.3, and a multiplicity of said microspheres mixed with and dispersed within said bait in a proportional quantity for producing a semi-solid dispersion having a specific gravity of less than 0.9.

7. The fishing lure of claim 6 wherein said bait material is cheese and said proportional quantity is approximately 94% by weight of cheese and 6% by weight of microspheres.

8. A method of compounding a buoyant fishing lure composition for mounting on and engulfing a fish hook comprising the steps of measuring the specific gravity of a non-buoyant fishing bait material, adding buoyant microspheres of a substance which is unaffected by the bait material to a quantity of said bait material in related weight percentages for producing a resultant buoyant mass, and mixing said bait material and microspheres until a relatively homogeneous dispersion is formed.

9. The fishing lure composition of claim 1 having a consistency for applying to and remaining on the fish hook.

10. The fishing lure of claim 2 wherein said bait material is cheese.

References Cited

FOREIGN PATENTS 160,073 3/1954 Australia.
513,045 5/1955 Canada.
788,999 10/1935 France.

HYMAN LORD, *Primary Examiner.*

A. LOUIS MONACELL, *Examiner.*

S. E. HEYMAN, *Assistant Examiner.*